United States Patent
Han et al.

(10) Patent No.: US 10,095,349 B2
(45) Date of Patent: Oct. 9, 2018

(54) SENSOR SCREEN PERCEIVING TOUCH AND FINGERPRINT

(71) Applicant: LG DISPLAY CO., LTD., Seoul (KR)

(72) Inventors: Manhyeop Han, Seoul (KR); Jiho Cho, Gimpo-si (KR); Junghoon Lee, Incheon (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/392,795

(22) Filed: Dec. 28, 2016

(65) Prior Publication Data

US 2017/0336910 A1    Nov. 23, 2017

(30) Foreign Application Priority Data

May 20, 2016    (KR) .................. 10-2016-0061994

(51) Int. Cl.
  *G06F 3/044*    (2006.01)
  *G06F 3/041*    (2006.01)
  *G06K 9/00*    (2006.01)

(52) U.S. Cl.
  CPC ............ *G06F 3/0416* (2013.01); *G06F 3/044* (2013.01); *G06K 9/0002* (2013.01)

(58) Field of Classification Search
  CPC ........ G06K 9/0002; G06F 3/041; G06F 3/044
  USPC ............... 178/18.01–19.07; 345/173–178
  See application file for complete search history.

(56) References Cited

U.S. PATENT DOCUMENTS

| | | | |
|---|---|---|---|
| 8,872,526 B1* | 10/2014 | Hoshtanar | G06K 9/0002 324/658 |
| 2009/0273572 A1* | 11/2009 | Edwards | G06F 3/044 345/173 |
| 2012/0105081 A1* | 5/2012 | Shaikh | G06K 9/0002 324/686 |
| 2013/0207924 A1* | 8/2013 | Mohindra | G06F 3/044 345/174 |

* cited by examiner

*Primary Examiner* — Michael Pervan
(74) *Attorney, Agent, or Firm* — Seed Intellectual Property Law Group LLP

(57) ABSTRACT

The present disclosure relates to a sensor screen capable of recognizing a touch and a fingerprint. A touch screen includes an active area having a minor axis and a major axis intersecting each other, and a bezel area outside the active area. The touch screen includes a plurality of touch sensing electrode groups arranged in the minor axis direction, a plurality of touch driving electrode groups arranged in the major axis direction, a plurality of fingerprint and touch driving electrodes arranged in the major axis direction between the touch driving electrode groups, a plurality of fingerprint and touch sensing electrodes arranged adjacent to the outermost touch sensing electrode group from among the plurality of touch sensing electrode groups and a read-out IC arranged adjacent to the plurality of fingerprint and touch sensing electrodes.

10 Claims, 10 Drawing Sheets

SENSOR SCREEN PERCEIVING TOUCH AND FINGERPRINT

CROSS-REFERENCE TO RELATED APPLICATIONS

This application claims the benefit of priority under 35 U.S.C. § 119(a) to Republic of Korea Patent Application No. 10-2016-0061994 filed on May 20, 2016, the entire contents of which is incorporated herein by reference for all purposes as if fully set forth herein.

BACKGROUND

Technical Field

The present disclosure relates to a sensor screen, and more particularly to a sensor screen capable of perceiving touch and fingerprints.

Description of the Related Art

With the development of computer technology, computer based systems that can be applied to various utilities such as notebook computers, tablet personal computers (PCs), smart phones, personal digital assistants (PDAs), automated teller machines (ATMs), and information systems, have been developed. In general, computer based systems store various data including private information such as secret business information and personal information related to private affairs. Thus, strong security mechanisms are typically desired to protect such information.

To this end, fingerprint sensors have been developed to strengthen security by performing registration or certification of systems using fingerprints of human beings.

The fingerprint sensor is a sensor capable of sensing fingerprints of human beings. A fingerprint sensor can be classified into an optical fingerprint sensor and a capacitive fingerprint sensor.

The optical fingerprint sensor is based on the principle that a light source, such as a light emitting diode (LED), emits light and the light reflected from ridges and valleys of a fingerprint is sensed through a CMOS image sensor. However, problems in this field concern an increase in size due to the use of LEDs and a rise in the product cost due to the use of expensive light source.

The capacitive fingerprint sensor utilizes a difference of electric charges charged between ridges and valleys of the fingerprint contacted thereto.

U.S. Patent Publication No. 2013/0307818 published on Nov. 21, 2013 and entitled "Capacitive Sensor Packaging" describes a capacitive fingerprint sensor of a related art.

The published capacitive fingerprint sensor is configured as an assembly form coupled with a particular push button. The capacitive fingerprint sensor includes a silicon wafer, on which a circuit for measuring a capacitance between a fingerprint (ridges and valleys) and a capacitive plate is printed.

In general, the capacitive fingerprint sensor described in US Patent Publication No. 2013/0307818 may need a high resolution sensor array and an integrated circuit (IC) for the fingerprint recognition processing because the fingerprint's ridges and valleys have a very minute size of about 300 μm to 500 μm. To this end, the capacitive fingerprint sensor utilizes the silicon wafer for integrating the IC with the sensor array.

However, when a high-resolution sensor array and an IC are formed together using a silicon wafer, an assembly structure for combining a fingerprint sensor and a push button is needed, resulting in a complicated configuration and increase in non-display area (i.e., bezel area). Furthermore, since the push button (e.g., a home button of a smartphone) and the fingerprint sensor overlap, the thickness increases and a fingerprint sensing area depends on the size of the push button.

To address the above-described problems, a technology has been developed to use an area of a touch sensor screen as a fingerprint identification area. The technology is described in U.S. Pat. No. 8,564,314 issued on Oct. 22, 2013 and entitled "Capacitive touch sensor for identifying a fingerprint" and Korean Patent No. 10-1432988 issued on Aug. 18, 2014 and entitled "Fingerprint recognition integrated type capacitive touch screen".

FIG. 1 is a plan view schematically illustrating an arrangement of driving electrodes and sensing electrodes of a capacitive sensing panel shown in FIG. 5 of U.S. Pat. No. 8,564,314. FIG. 2 is a plan view illustrating the configuration of a fingerprint recognition integrated type capacitive touch screen shown in FIG. 3 of Korean Patent No. 10-1432988.

Referring to FIG. 1, a capacitive touch sensor for identifying a fingerprint includes a touch sensor 403 including touch driving electrodes 401($x$) and touch sensing electrodes 401($y$) and a fingerprint sensor 405 including fingerprint driving electrodes 405($x$) and fingerprint sensing electrodes 405($y$). In the capacitive touch sensor for identifying the fingerprint, because the fingerprint sensor 405 is separately disposed in a portion of a screen area, problems may be generated such as a non-touch of the fingerprint sensor 405 or a reduction in a touch performance around the fingerprint sensor 405.

Referring to FIG. 2, a fingerprint recognition integrated type capacitive touch screen includes a touch panel 110, electrode connection lines 120, and a touch controller 130. The touch panel 110 includes fine channels 113 formed by a combination of first channel electrodes 111 (one of Tx and Rx) and second channel electrodes 112 (the other of Tx and Rx) crossing each other. The fine channels 113 are configured such that the fine channels 113 of a remaining area except an area of fingerprint recognition sensors 114 form a plurality of groups each serving as a touch group channel 115 for sensing a touch signal, and the fine channels 113 corresponding to the area of the fingerprint recognition sensors 114 each serve as a fingerprint recognition channel 116. However, this fingerprint recognition integrated type capacitive touch screen may greatly increase a mutual capacitance between touch channels because of the fine channels 113 (i.e., the touch channels) serving as the touch group channels 115. Because an increase in the mutual capacitance reduces sensitivity of the touch sensor, a touch operation may not be recognized when the touch operation is generated.

BRIEF SUMMARY

The present disclosure provides a sensor screen for solving problems of the aforementioned capacitive fingerprint sensor.

In one aspect, there is provided a touch screen including an active area having a minor axis and a major axis intersecting each other, and a bezel area outside the active area. The touch screen comprises a plurality of touch sensing electrode groups arranged in the minor axis direction; a plurality of touch driving electrode groups arranged in the major axis direction; a plurality of fingerprint/touch driving electrodes arranged in the major axis direction between the touch driving electrode groups; a plurality of fingerprint/touch sensing electrodes arranged adjacent to the outermost touch sensing electrode group from among the plurality of touch sensing electrode groups; and a read-out IC arranged adjacent to the plurality of fingerprint/touch sensing electrodes.

The touch screen further comprises ground electrodes arranged between neighboring touch sensing electrode groups and between a touch sensing electrode group and a fingerprint/touch sensing electrode adjacent to each other.

The width of each ground electrode is greater than the width of each touch sensing electrode group.

Some of the ground electrodes are combined by a first ground routing wire at one side of the bezel area and the remaining ground electrodes are combined by a second ground routing wire at the other side of the bezel area.

A fingerprint/touch area is defined by cross of the plurality of fingerprint/touch driving electrodes and the plurality of fingerprint/touch sensing electrodes, and the plurality of fingerprint/touch sensing electrodes are extended from the fingerprint/touch area to both ends of the active area outside the fingerprint/touch area.

A fingerprint/touch area is defined by intersection of the plurality of fingerprint/touch driving electrodes and the plurality of fingerprint/touch sensing electrodes, the plurality of fingerprint/touch sensing electrodes are extended from one end of the fingerprint/touch area to one end of the active area outside the fingerprint/touch area through the fingerprint/touch area. And the touch screen further comprises a touch sensing electrode separated from the plurality of fingerprint/touch sensing electrodes and extended from the other end of the fingerprint/touch area to the other end of the active area outside the fingerprint/touch area.

During touch driving, the read-out IC provides a touch driving signal to the plurality of touch driving electrode groups and the plurality of fingerprint/touch driving electrodes through a plurality of touch driving routing wires and a plurality of fingerprint/touch driving routing wires and receives a touch signal sensed from the plurality of touch sensing electrode groups and the plurality of fingerprint/touch sensing electrodes through a plurality of touch sensing routing wires and a plurality of fingerprint/touch sensing routing wires.

During fingerprint driving, the read-out IC provides a fingerprint driving signal to the plurality of fingerprint/touch driving electrodes through a plurality of fingerprint/touch driving routing wires and receives a fingerprint signal sensed from the plurality of fingerprint/touch sensing electrodes through a plurality of fingerprint/touch sensing routing wires.

The read-out IC comprises a first integration block including first integrators respectively connected to the plurality of touch sensing routing wires; and a first analog/digital converter unit including first touch analog/digital converters for receiving and analog-to-digital converting the outputs of the first integrators.

The read-out IC comprises a switching block including a plurality of switching elements controlled by a touch enable signal and a fingerprint enable signal having opposite polarities and outputting a plurality of sensing signals transmitted from the fingerprint/touch sensing routing wires or integrating the sensing signals into one signal and outputting the integrated signal; a second integration block including second integrators for receiving the plurality of sensing signals supplied from the switching block; a third integration block including a third integrator for receiving the integrated sensing signal supplied from the switching block; a second analog/digital converter unit including fingerprint analog/digital converters for receiving and analog-to-digital converting outputs of the second integrators; and a third analog/digital converter unit including a second touch analog/digital converter for receiving and analog-to-digital converting the output of the third integrator.

The read-out IC provides driving voltages for touch and fingerprint recognition to the plurality of driving electrode groups and the plurality of fingerprint/touch driving electrodes and recognizes a touch and a fingerprint by sensing the plurality of touch sensing electrode groups and the plurality of fingerprint/touch sensing electrodes.

According to the sensor screen according to the present disclosure, it is possible to reduce parasitic capacitance of sensing electrodes and the time constant of driving electrodes by employing the major axis driving scheme in which the touch sensing electrode groups and the fingerprint/touch sensing electrode groups are arranged in the minor axis direction and the touch driving electrode groups and the fingerprint/touch driving electrodes are arranged in the major axis direction, thereby improving touch recognition and fingerprint recognition accuracy.

In addition, in the screen sensor according to the present disclosure, the ground electrodes are arranged above and below the touch sensing electrode groups and the fingerprint/touch sensing electrode groups. Accordingly, neighboring touch sensing electrode groups are shielded from each other, a touch sensing electrode group and a fingerprint/touch sensing electrode group, which are adjacent to each other, are shielded from each other and neighboring fingerprint/touch sensing electrode groups are shielded from each other, and thus electromagnetic effects are not applied to neighboring electrodes. Therefore, touch recognition and fingerprint recognition accuracy can be enhanced.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts. Detailed description of known arts will be omitted if it is determined that the arts can mislead the embodiments of the disclosure. Names of the respective elements used in the following explanations are selected only for convenience of writing the specification and may be thus different from those used in actual products.

In description of preferred embodiments of the present disclosure, "fingerprint/touch sensor" (which may be referred to herein as a "fingerprint and touch sensor") refers to a fingerprint sensor used as a touch sensor, which serves as a touch sensor for touch driving and touch sensing during a touch sensing period for sensing touch applied to a touch screen and serves as a fingerprint sensor for sensing input of a fingerprint during a fingerprint sensing period for fingerprint recognition.

"Touch area" refers to an area in which only touch applied to the touch screen can be perceived and "fingerprint/touch area" (which may be referred to herein as "fingerprint and touch area") refers to an area in which both touch and fingerprint applied to the touch screen can be perceived. "Active area" refers to an area including the touch area and the fingerprint/touch area and "bezel area" refers to an area outside the active area of the touch screen.

In addition, "horizontal driving" or "minor axis driving" refers to a method of performing touch recognition and fingerprint recognition through capacitance variations by supplying a driving voltage to touch electrodes and fingerprint/touch electrodes (which may be referred to herein as "fingerprint and touch electrodes") of the horizontal axis (minor axis) and sensing touch electrodes and fingerprint/touch electrodes of the vertical axis (major axis) in a touch screen panel having a longer vertical axis than a horizontal axis, whereas "vertical driving" or "major axis driving" refers to a method of performing touch recognition and fingerprint recognition through capacitance variations by supplying a driving voltage to touch electrodes and fingerprint/touch electrodes of the vertical axis (major axis) and sensing touch electrodes and fingerprint/touch electrodes of the horizontal axis (minor axis) in a touch screen panel having a longer vertical axis than a horizontal axis.

Furthermore, "touch electrode" includes a touch driving electrode and a touch sensing electrode and "fingerprint/touch electrode" includes a fingerprint/touch driving electrode (or "fingerprint and touch driving electrode") and a fingerprint/touch sensing electrode (or "fingerprint and touch sensing electrode").

Figure 1:
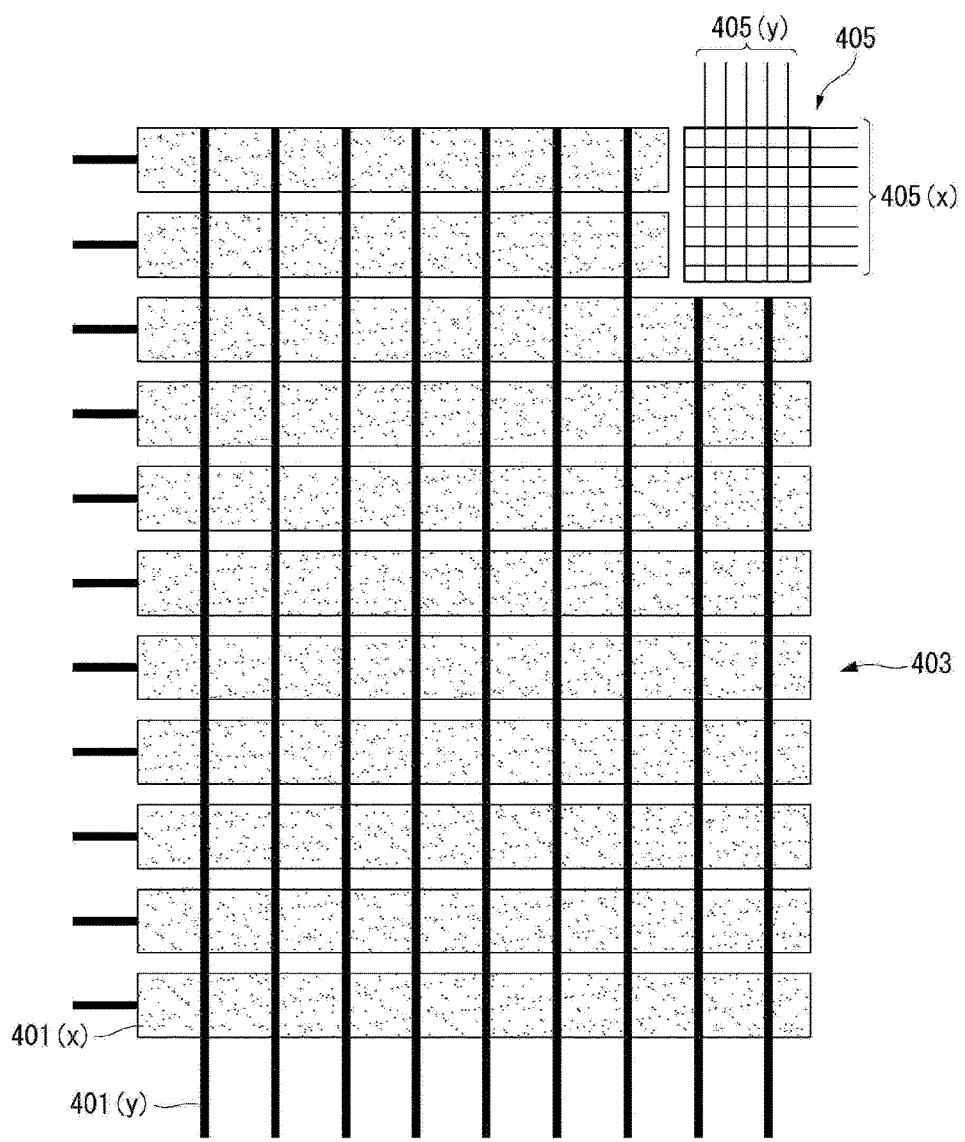
FIG. 1 is a plan view schematically illustrating an arrangement of driving electrodes and sensing electrodes of a capacitive sensing panel of a related art.
Figure 2:
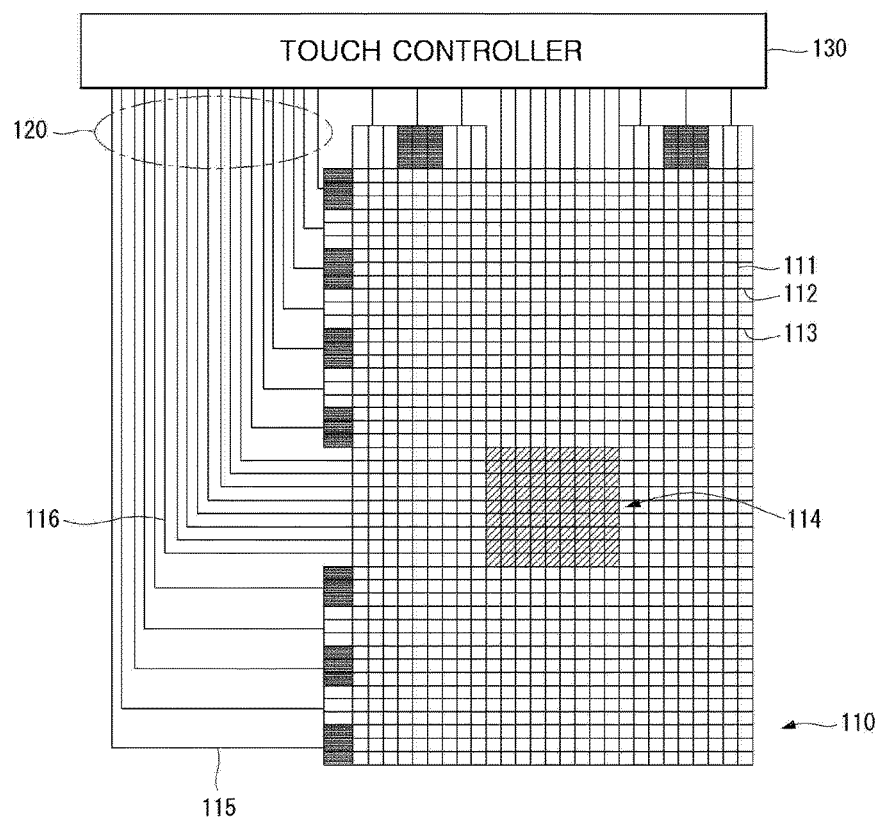
FIG. 2 is a plan view illustrating a configuration of a fingerprint recognition integrated type capacitive touch screen of a related art.
Figure 3:
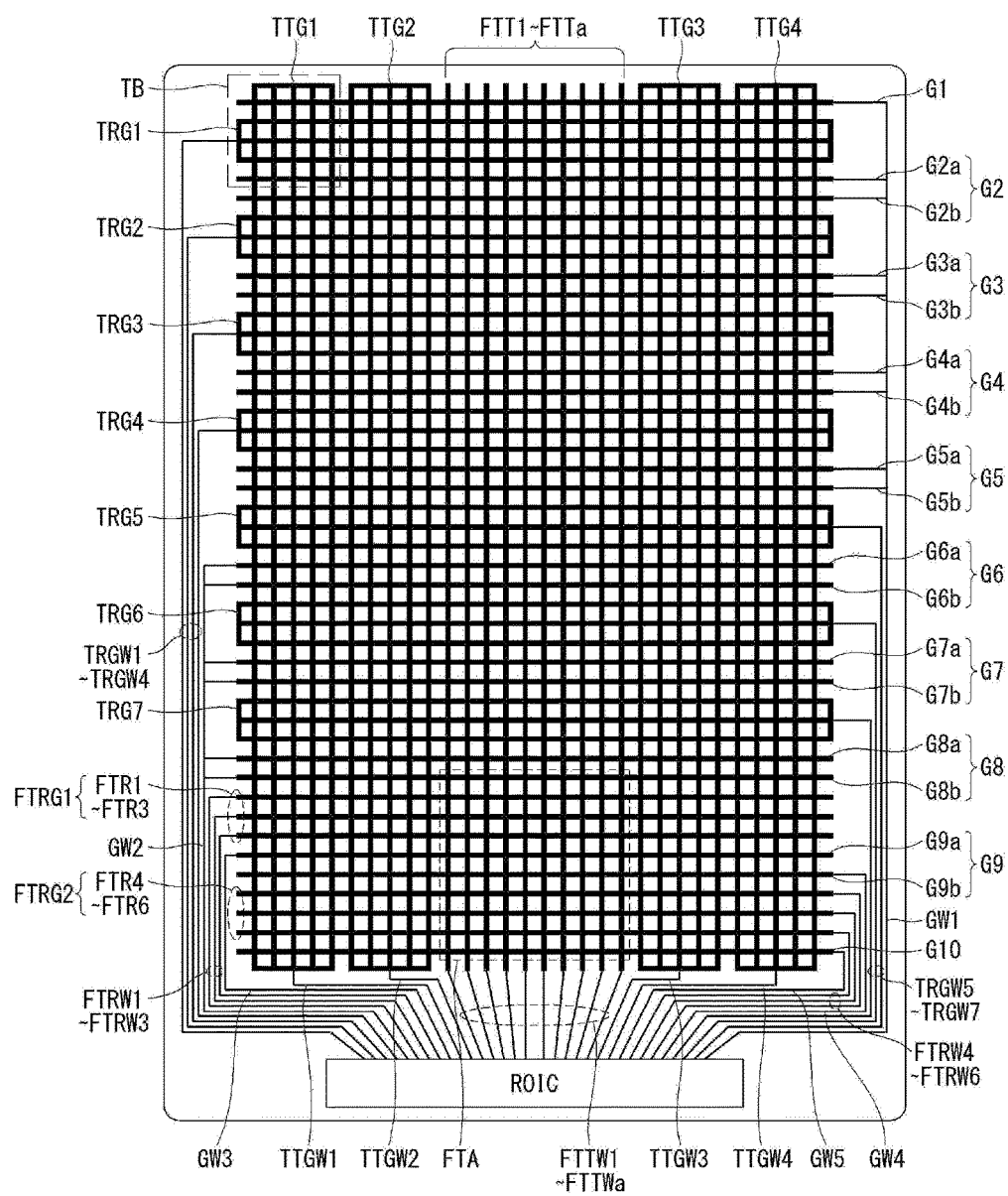
FIG. 3 is a plan view schematically illustrating a sensor screen according to an embodiment of the present disclosure.

A description will be given of a sensor screen according to an embodiment of the present disclosure. FIG. 3 is a plan view schematically illustrating the sensor screen according to an embodiment of the present disclosure.

Referring to FIG. 3, the sensor screen according to an embodiment of the present disclosure includes an active area AA including a fingerprint/touch area FTA and a bezel area BA outside the active area AA.

The active area AA includes a plurality of touch electrodes and a plurality of fingerprint/touch electrodes.

The plurality of touch electrodes includes a plurality of touch sensing electrode groups TRG1 to TRG7 arranged in a minor axis direction (e.g., x-axis direction) intersecting a major axis direction (e.g., y-axis direction) along the major axis direction, and a plurality of touch driving electrode groups TTG1 to TTG4 arranged in the major axis direction intersecting the minor axis direction along the minor axis direction.

Each of the plurality of touch sensing electrode groups TRG1 to TRG7 includes a plurality of touch sensing electrodes connected on at least one end thereof and each of the plurality of touch driving electrode groups TTG1 to TTG4 includes a plurality of touch driving electrodes connected to at least one end thereof.

The plurality of fingerprint/touch electrodes include a plurality of fingerprint/touch sensing electrodes FTR1 to FTR6 arranged in the minor axis direction along the major axis direction and a plurality of fingerprint/touch driving electrodes FTT1 to FTTa arranged in the major axis direction along the minor axis direction.

The active area AA includes ground electrodes G1 to G8a arranged above and below the plurality of touch sensing electrode groups TRG1 to TRG7 and ground electrodes G8b to G10 arranged above and below a plurality of fingerprint/touch sensing electrode groups FTRG1 and FTRG2 each including a plurality of fingerprint/touch sensing electrodes FTR1 to FTR3 and FTR4 to FTR6.

In the active area AA, a touch block TB is defined, for example, as an area in which the first touch sensing electrode group TRG1 in the first row and the ground electrodes G1 and G2a arranged above and below the first touch sensing electrode group TRG1 intersect the first touch driving electrode group TTG1 in the first column, as illustrated in FIG. 3. In this manner, the active area AA has a plurality of touch blocks.

According to the above-described configuration, the fingerprint/touch area FTA of the active area AA is defined as an area in which the fingerprint/touch sensing electrodes FTR1 to FTR6 intersect the fingerprint/touch driving electrodes FTT1 to FTTa.

In the embodiment of FIG. 3, the plurality of fingerprint/touch sensing electrodes FTR1 to FTR6 are arranged in the lower part of the active area AA and the plurality of fingerprint/touch driving electrodes FTT1 to FTTa are arranged at the center of the active area AA. However, the present disclosure is not limited thereto and the fingerprint/touch sensing electrodes FTR1 to FTR6 and the fingerprint/touch driving electrodes FTT1 to FTTa can be disposed in any part of the active area as necessary.

The bezel area BA includes touch sensing routing wires TRGW1 to TRGW7 respectively connected to the touch sensing electrode groups TRG1 to TRG7, touch driving routing wires TTGW1 to TTGW4 respectively connected to the touch driving electrode groups TTG1 to TTG4, fingerprint/touch sensing routing wires FTRW1 to FTRW6 respectively connected to the fingerprint/touch sensing electrodes FTR1 to FTR6, and fingerprint/touch driving routing wires FTTW1 to FTTWa respectively connected to the fingerprint/touch driving electrodes FTT1 to FTTa.

In addition, the bezel area BA includes ground wires GW1 to GW5 connected to the ground electrodes G1 to G5b, G6b to G8b, G9a, G9b and G10.

The first ground wire GW1 from among the ground wires GW1 to GW4 connects the ground electrodes G1 to G5b from among the ground electrodes G1 to G5b, G6b to G8b, G9a, G9b and G10, which are arranged in the active area AA, in the right bezel area. The second ground wire GW2 connects the ground electrodes G6b to G8b in the left bezel area. The third ground wire GW3 is connected to the ground electrode G9a from among the ground electrodes G9a, G9b and G10 which pass through the fingerprint/touch area FTA in the left bezel area, the fourth ground wire GW4 is connected to the ground electrode G9b in the right bezel area, and the fifth ground wire GW5 is connected to the ground electrode G10 in the right bezel area.

The sensor screen according to the present disclosure can reduce the bezel area BA because the ground electrodes are divided into upper and lower parts and grouped in the touch area and the fingerprint/touch area and connected to the ground wires. In addition, pads (not shown) connected to the ground wires GW1, GW2, GW3, GW4 and GW5, the touch sensing routing wires TRGW1 to TRGW7, the touch driving routing wires TTGW1 to TTGW4, the fingerprint/touch sensing routing wires FTRW1 to FTRGW6 and the fingerprint/touch driving routing wires FTTW1 to FTTWa, and a read-out IC ROIC connected to the pads can be arranged at one end of the bezel area BS. The read-out IC ROIC can be mounted on a flexible circuit board (not shown) and connected to the pads through wires formed on the flexible circuit board.

The aforementioned sensor screen according to the embodiment of the present disclosure can serve as a touch sensor for touch sensing when normally used and a specific area (fingerprint/touch area) of the active area can serve as a fingerprint sensor for fingerprint sensing only when fingerprint recognition is required.

When the sensor screen according to the embodiment of the present disclosure operates as the touch sensor, a touch driving voltage is supplied to the touch driving electrode groups TTG1 to TTG4 through the touch driving routing wires TTGW1 to TTGW4 and is sequentially provided to the fingerprint/touch driving electrodes FTT1 to FTTa through the fingerprint/touch driving routing wires FTTW1 to FTTWa. Touch sensing signals obtained by sensing the touch sensing electrode groups TRG1 to TRG7 are supplied through the touch sensing routing wires TRGW1 to TRGW7, and touch sensing signals obtained by sensing the fingerprint/touch driving electrodes FTT1 to FTTa are supplied through the fingerprint/touch driving routing wires FTTW1 to FTTWa.

When a user requests fingerprint recognition, that is, when the sensor screen according to the embodiment of the present disclosure operates as a fingerprint sensor, a fingerprint driving voltage is supplied to the fingerprint/touch driving electrodes FTT1 to FTTa through the fingerprint/touch driving routing wires FTTW1 to FTTWa. Fingerprint sensing signals obtained by sensing the fingerprint/touch sensing electrodes FTR1 to FTR6 are supplied to the read-out IC ROIC through the fingerprint/touch sensing routing wires FTRW1 to FTRW6.

The read-out IC ROIC integrates the touch sensing signals and the fingerprint sensing signals, and converts the integrated analog signals into digital signals and outputs the digital signals to a fingerprint/touch controller FTC. The fingerprint/touch controller FTC can recognize a touch point and recognize a registered fingerprint using a known touch recognition algorithm and a fingerprint recognition algorithm.

The screen sensor according to the embodiment of the present disclosure can reduce parasitic capacitance of the sensing electrodes and time constants of the driving electrodes to improve touch recognition and fingerprint recognition accuracy by employing a major axis driving type in which the touch sensing electrode groups TRG1 to TRG7 and the fingerprint/touch sensing electrode groups FTRG1 and FTRG2 are arranged in the minor axis direction and the touch driving electrode groups TTG1 to TTG4 and the fingerprint/touch driving electrodes FTT1 to FTTa are arranged in the major axis direction.

In the screen sensor according to the embodiment of the present disclosure, the ground electrodes G1 to G5b, G6b to G8b, G9a and G9b, and G10 are arranged above and below the touch sensing electrode groups TRG1 to TRG7 and above and below the fingerprint/touch sensing electrode groups FTRG1 and FTRG2, as illustrated in FIG. 3. Accordingly, neighboring touch sensing electrode groups TRG1 to TRG7 are shielded from each other, the touch sensing electrode group TRG7 and the fingerprint/touch sensing electrode group FRTG1, which are adjacent to each other, are shielded from each other and the neighboring fingerprint/touch sensing electrode groups FTRG1 and FTRG 2 are shielded from each other, and thus electromagnetic effects are not applied to neighboring electrodes. Therefore, touch recognition and fingerprint recognition accuracy can be improved.

Figure 4:
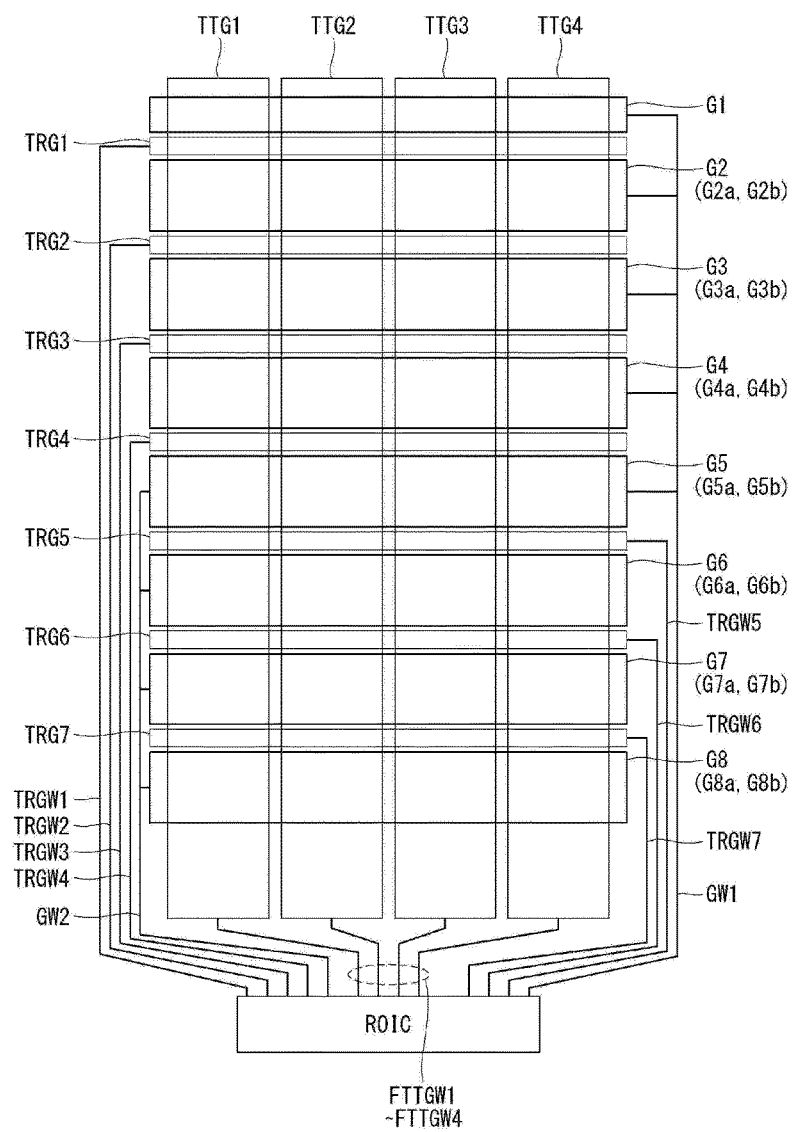
FIG. 4 is a plan view illustrating a configuration in which touch electrodes and ground electrodes are connected to a read-out IC through touch routing wires and ground wires in an active area illustrated in FIG. 3.

FIG. 4 is a plan view illustrating a configuration in which touch electrodes including the touch driving electrode groups TTG1 to TTG4 and the touch sensing electrode groups TRG1 to TRG7, and the ground electrodes G1 to G8 are connected to the read-out IC ROIC through the touch routing wires TTGW1 to TTGW4 and TRGW1 to TRGW7 and the ground wires GW1 and GW2 in the active area AA, shown in FIG. 3. For convenience of description, the fingerprint/touch sensing electrodes FTR1 to FTR6, the fingerprint/touch sensing routing wires FTRW1 to FTRGW6, the fingerprint/touch driving electrodes FTT1 to FTTa and the fingerprint/touch driving routing wires FTTW1 to FTTWa are omitted.

Referring to FIG. 4, the size of each of the ground electrodes G1 to G8 is set to be greater than the size of each of the touch sensing electrodes constituting the touch sensing electrode groups TRG1 to TRG7. This can reduce parasitic capacitance between neighboring touch sensing electrode groups.

The ground electrode G1 located at the top of the active area AA and the ground electrode G10 (refer to FIG. 3) located at a lower-side end of the active area AA are set to have the same size and the ground electrodes G2 to G8 arranged between the ground electrodes G1 and G10 are set to be smaller than the ground electrodes G2 to G8. The ground electrodes G2 to G7 arranged between the touch sensing electrode groups TRG1 to TRG7 and the ground electrode G8 arranged between the touch sensing electrode group TRG8 and the fingerprint/touch sensing electrode group FTRG1 in the active area AA may be approximately twice as large as the ground electrode G1 disposed at the top of the active area AA. However, the present disclosure is not limited thereto ground electrode pairs G2a and G2b, G3a and G3b, G4a and G4b, G5a and G5b, G6a and G6b, G7a and G7b and G8a and G8b which have the same size as the ground electrode G1 may be arranged, as illustrated in FIG. 3.

The touch driving routing wires TTGW1 to TTGW4 are connected to the read-out IC ROIC and thus the touch driving voltage is supplied to the touch driving electrode groups TTG1 to TTG4 through the touch driving routing wires TTGW1 to TTGW4. Sensing signals sensed from the touch sensing electrode groups TRG1 to TRG4 arranged in the upper part of the active area AA are supplied to the read-out IC ROIC through the touch driving routing wires TTGW1 to TTGW4 arranged in the left bezel area BA. Sensing signals sensed from the touch sensing electrode groups TRG5 to TRG7 arranged in the lower part of the active area AA are supplied to the read-out IC ROIC through the touch driving routing wires TTGW5 to TTGW7 arranged in the right bezel area BA.

Figure 7:
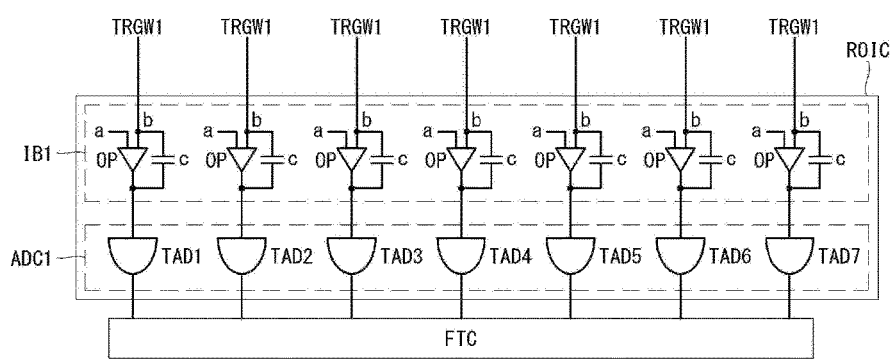
FIG. 7 is a block diagram schematically illustrating a configuration of the read-out IC connected to the touch electrodes of the touch area illustrated in FIG. 4.

The read-out IC ROIC integrates touch sensing signals, converts the integrated analog signals into digital signals and outputs the digital signals to the fingerprint/touch controller FTC (refer to FIG. 7).

Figure 5:
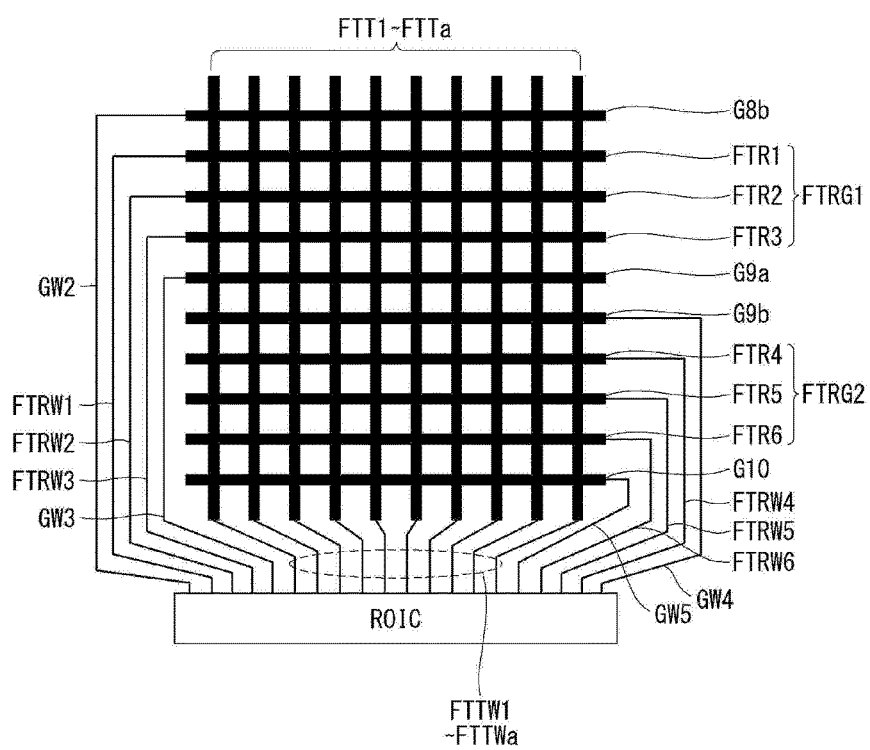
FIG. 5 is a plan view illustrating an example of a configuration in which fingerprint/touch driving electrodes and fingerprint/touch sensing electrodes are connected to a fingerprint/touch read-out IC (ROIC) through fingerprint/touch routing wires in a fingerprint/touch area illustrated in FIG. 3.

FIG. 5 is a plan view illustrating an example of a configuration in which fingerprint/touch driving electrodes and fingerprint/touch sensing electrodes are connected to the read-out IC ROIC through fingerprint/touch routing wires in the fingerprint/touch area FTA illustrated in FIG. 3.

Referring to FIG. 5, the fingerprint/touch driving electrodes FTT1 to FTTa are arranged in the major axis direction. The fingerprint/touch sensing electrodes FTR1 to FTR6 are grouped into two fingerprint/touch sensing electrode groups FTRG1 and FTRG2 and arranged in the minor axis direction. The ground electrodes G8b and G9a are arranged above and below the fingerprint/touch sensing electrode group FTRG1 and the ground electrodes G9b and G10 are arranged above and below the fingerprint/touch sensing electrode group FTRG2.

The ground electrodes G8b, G9a, G9b and G10 have the same size as the ground electrode G1 disposed at the top of the active area AA. The ground electrodes G8 and the ground electrode G9a may be integrated into one electrode and the ground electrodes G9a and G9b may be integrated into one electrode.

The fingerprint/touch driving electrodes FTT1 to FTTa are connected to the read-out IC ROIC through the fingerprint/touch driving routing wires FTTW1 to FTTWa. The read-out IC ROIC supplies a touch driving voltage to the fingerprint/touch driving electrodes FTT1 to FTTa during touch driving and supplies a fingerprint driving voltage to the fingerprint/touch electrodes FTT1 to FTTa during fingerprint driving.

The first fingerprint/touch sensing electrodes FTR1 to FTR3 belonging to the first fingerprint/touch sensing electrode group FTRG1 are connected to the read-out IC (ROIC) through the first fingerprint/touch sensing routing wires FTRW1 to FTRW3 arranged in the left bezel area BA. The second fingerprint/touch sensing electrodes FTR4 to FTR6 belonging to the second fingerprint/touch sensing electrode group FTRG2 are connected to the read-out IC (ROIC) through the second fingerprint/touch sensing routing wires FTRW4 to FTRW6 arranged in the right bezel area BA.

In touch driving, the first fingerprint/touch sensing routing wires FTRW1 to FTRW3 are grouped to deliver sensing signals sensed from the first fingerprint/touch sensing electrodes FTR1 to FTR3 to the read-out IC ROIC. In addition, the second fingerprint/touch sensing routing wires FTRW4 to FTRW6 are grouped to deliver sensing signals sensed from the second fingerprint/touch sensing electrodes FTR4 to FTR6 to the read-out IC ROIC.

Figure 8:
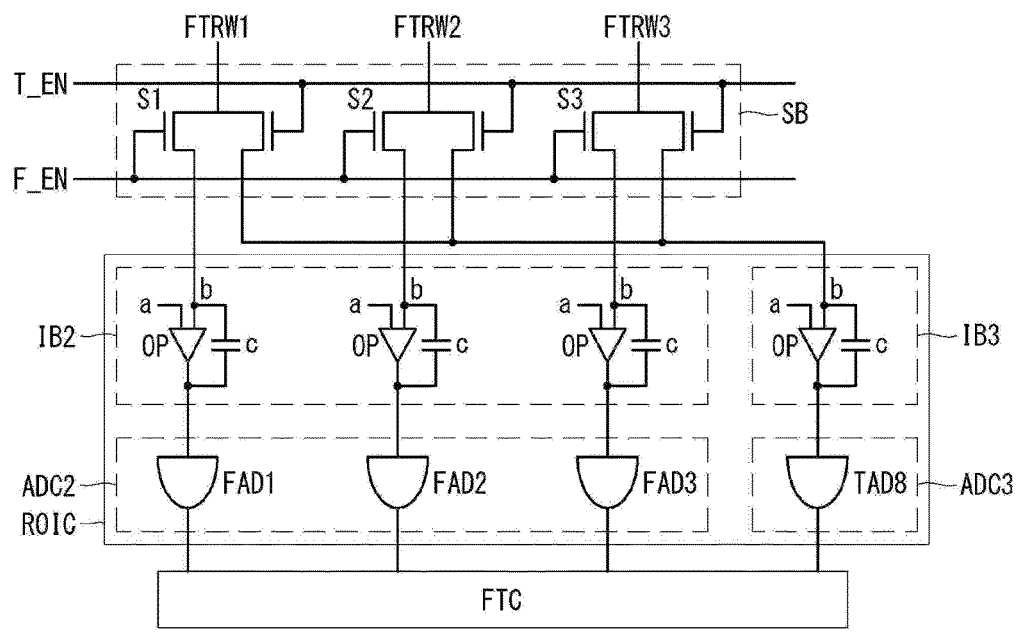
FIG. 8 is a block diagram schematically illustrating a configuration of the read-out IC connected to the fingerprint/touch electrodes of the fingerprint/touch area illustrated in FIG. 5.

The read-out IC ROIC integrates the sensing signals, converts the integrated analog signals into digital signals and supplies the digital signals to the fingerprint/touch controller FTC (refer to FIG. 8).

In fingerprint driving, the first fingerprint/touch sensing routing wires FTRW1 to FTRW3 respectively deliver sensing signals sensed from the first fingerprint/touch sensing electrodes FTR1 to FTR3 to the read-out IC ROIC. In addition, the second fingerprint/touch sensing routing wires FTRW4 to FTRW6 respectively deliver sensing signals sensed from the second fingerprint/touch sensing electrodes FTR4 to FTR6 to the read-out IC ROIC. The read-out IC ROIC integrates the sensing signals, converts the integrated analog signals into digital signals and supplies the digital signals to the fingerprint/touch controller FTC (refer to FIG. 8).

The ground electrodes G8b to G10 arranged within the fingerprint/touch area FTA can operate as ground electrodes or fingerprint/touch sensing electrodes according to driving mode. For example, when the ground electrodes G8b to G10 are switched to be connected to a ground source or the read-out IC ROIC according to driving mode, the ground electrodes G8b to G10 can serve as ground electrode during touch driving and serve as fingerprint/touch sensing electrodes during fingerprint driving.

Figure 6:
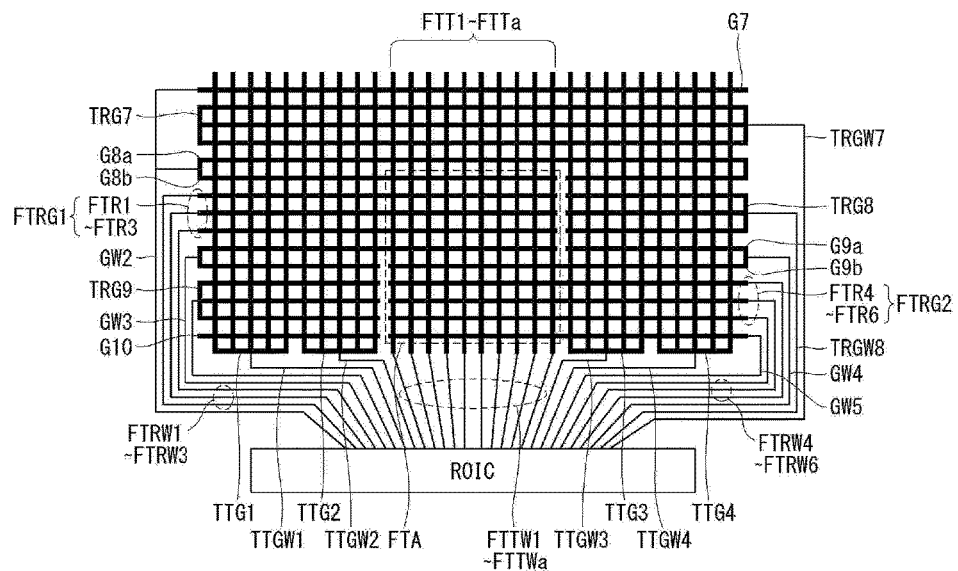
FIG. 6 is a plan view illustrating another example of the configuration in which the fingerprint/touch driving electrodes and the fingerprint/touch sensing electrodes are connected to the fingerprint/touch read-out IC (ROIC) through fingerprint/touch routing wires in the fingerprint/touch area illustrated in FIG. 3.

FIG. 6 is a plan view illustrating another example of the configuration in which the fingerprint/touch driving electrodes and fingerprint/touch sensing electrodes are connected to the read-out IC (ROIC) through the fingerprint/touch routing wires in the fingerprint/touch area shown in FIG. 3.

Referring to FIG. 6, the fingerprint/touch driving electrodes FTT1 to FTTa are arranged in the major axis direction. The fingerprint/touch sensing electrodes FTR1 to FTR6 are grouped into two fingerprint/touch sensing electrode groups FTRG1 and FTRG2 and arranged in the minor axis direction, and the ground electrodes G8b and G9a are arranged above and below the fingerprint/touch sensing electrode group FTRG1 and the ground electrodes G9b and G10 are arranged above and below the fingerprint/touch sensing electrode group FTRG2.

In the embodiment of FIG. 6, the first fingerprint/touch sensing electrodes FTR1 to FTR3 belonging to the first fingerprint/touch sensing electrode group FTRG1, which is an odd-numbered fingerprint/touch sensing electrode group, are terminated at the right edge of the fingerprint/touch area FTA, whereas the second fingerprint/touch sensing electrodes FTR4 to FTR6 belonging to the second fingerprint/touch sensing electrode group FTRG2, which is an even-numbered fingerprint/touch sensing electrode group, are terminated at the left edge of the fingerprint/touch area FTA. The eighth touch sensing electrode group TRG8 is arranged in the active area AA at the right side of the fingerprint/touch area FTA, separated from the first fingerprint/touch sensing electrode group FTRG1, and the ninth touch sensing electrode group TRG9 is arranged in the active area AA at the left side of the fingerprint/touch area FTA, separated from the second fingerprint/touch sensing electrode group FTRG2.

The ground electrodes G8b, G9a, G9b and G10 have the same size as the ground electrode G8a disposed at the top of the active area AA. The ground electrodes G8a and G8b may be integrated into one electrode and the ground electrodes G9a and G9b may be integrated into one electrode.

The fingerprint/touch driving electrodes FTT1 to FTTa are connected to the read-out IC ROIC through the fingerprint/touch driving routing wires FTTW1 to FTTWa. The read-out IC ROIC supplies the touch driving voltage to the fingerprint/touch driving electrodes FTT1 to FTTa during touch driving and supplies the fingerprint driving voltage to the fingerprint/touch driving electrodes FTT1 to FTTa during fingerprint driving.

The first fingerprint/touch sensing electrodes FTR1 to FTR3 belonging to the first fingerprint/touch sensing electrode group FTRG1 are connected to the read-out IC ROIC through the first fingerprint/touch sensing routing wires FTRW1 to FTRW3 arranged in the left bezel area BA. The second fingerprint/touch sensing electrodes FTR4 to FTR6 belonging to the second fingerprint/touch sensing electrode group FTRG2 are connected to the read-out IC ROIC through the second fingerprint/touch sensing routing wires FTRW4 to FTRW6 arranged in the right bezel area BA.

The eighth touch sensing electrode group TRG8 disposed in the active area AA at the right side of the fingerprint/touch area FTA is connected to the read-out IC ROIC through the eighth fingerprint/touch sensing routing wires TRGW8 arranged in the right bezel area BA. The ninth touch sensing electrode group TRG9 disposed in the active area AA at the left side of the fingerprint/touch area FTA is connected to the read-out IC ROIC through the ninth fingerprint/touch sensing routing wires TRGW9 arranged in the left bezel area BA.

In case of touch driving, the first fingerprint/touch sensing routing wires FTRW1 to FTRW4 are grouped to deliver sensing signals sensed from the first fingerprint/touch sensing electrodes FTR1 to FTR3 to the read-out IC ROIC and the eighth touch sensing routing wire TRGW8 delivers a signal sensed from the eighth touch sensing electrode group TRG8 to the read-out IC ROIC.

In addition, the second fingerprint/touch sensing routing wires FTRW4 to FTRW6 are grouped to deliver sensing signals sensed from the second fingerprint/touch sensing electrodes FTR4 to FTR6 to the read-out IC ROIC and the ninth touch sensing routing wire TRGW9 delivers a signal sensed from the ninth touch sensing electrode group TRG9 to the read-out IC ROIC.

The read-out IC ROIC integrates signals sensed during touch driving, converts the integrated analog signals into digital signals and provides the digital signals to the fingerprint/touch controller FTC.

In fingerprint driving, the first fingerprint/touch sensing routing wires FTRW1 to FTRW3 respectively deliver sensing signals sensed from the first fingerprint/touch sensing electrodes FTR1 to FTR3 to the read-out IC ROIC, and the second fingerprint/touch sensing routing wires FTRW4 to FTRW6 respectively deliver sensing signals sensed from the first fingerprint/touch sensing electrodes FTR4 to FTR6 to the read-out IC ROIC.

The read-out IC ROIC integrates signals sensed during touch driving and signals sensed during fingerprint driving, converts the integrated analog signals into digital signals and provides the digital signals to the fingerprint/touch controller FTC.

In the embodiment of FIG. 6, the fingerprint/touch sensing electrodes are not arranged in the entire active area in the minor axis direction and thus the lengths of the fingerprint/touch sensing electrodes are shorter than the fingerprint/touch sensing electrodes in the embodiment of FIG. 5. Accordingly, resistance and parasitic capacitance of the fingerprint/touch sensing electrodes can be reduced. Therefore, the sensor screen according to the embodiment of FIG. 6 can increase fingerprint recognition sensitivity compared to the sensor screen according to the embodiment of FIG. 5.

FIG. 7 is a block diagram schematically illustrating a configuration of the read-out IC ROIC connected to the touch sensing electrodes of the touch area shown in FIG. 4.

Referring to FIG. 7, the read-out IC ROIC includes a first integration block IB1 connected to the touch sensing routing wires TRGW1 to TRGW7 and a first analog/digital converter unit ADC1 connected to output terminals of the first integration block IB1.

The first integration block IB1 includes integrators that respectively integrate analog sensing voltages received through the touch sensing routing wires TRGW1 to TRGW7. Each integrator of the integration block IB1 includes an operational amplifier OP having a first input terminal a to which a reference voltage Vref is applied, a second input terminal b connected to one of the touch sensing routing wires TRGW1 to TRGW7, and a single output terminal, and a capacitor C connected in parallel with the operational amplifier OP between the second input terminal b and the output terminal.

The first analog/digital converter unit ADC1 includes a plurality of first touch analog/digital converters TAD1 to TAD7 that respectively convert analog data output from the integrators of the first integration block IB1 into digital data.

The read-out IC ROIC provides the digital data output from the first analog/digital converter unit ADC1 to the fingerprint/touch controller FTC.

The fingerprint/touch controller FTC recognizes a touch point by analyzing the digital data supplied from the read-out IC ROIC using a known touch recognition algorithm.

FIG. 8 is a block diagram schematically illustrating a configuration of the read-out IC connected to the first fingerprint/touch sensing routing wires arranged in the left bezel area from among the fingerprint/touch sensing routing wires shown in FIG. 5. In FIG. 8, the configuration of the read-out IC connected to the second fingerprint/touch sensing routing wires FTRW4 to FTRW6 arranged at the right side of the bezel area BA is identical to the configuration of the read-out IC connected to the first fingerprint/touch sensing routing wires FTRW1 to FTRW3 and thus is omitted to avoid complexity of the figure.

Referring to FIG. 8, the read-out IC ROIC includes a switching block SB, a second integration block IB2 connected to the first fingerprint/touch sensing routing wires FTRW1 to FTRW3 through the switching block SB, a third integration block IB3 connected to one line to which the first fingerprint/touch sensing routing wires FTRW1 to FTRW3 are grouped and connected, through the switching block SB, a second analog/digital converter unit ADC2 connected to output terminals of the second integration block IB2 and a third analog/digital converter unit ADC3 connected to the output terminal of the third integration block IB3.

The switching block SB includes first to third switching elements S1 to S3.

The first to third switching elements S1 to S3 are controlled by a touch enable signal T_EN and a fingerprint enable signal F_EN which have opposite polarities and provide sensing signals transmitted from the fingerprint/touch routing wires FTRW1 to FTRW3 to the second integration block IB2 or the third integration block LB3. For example, when the first to third switching elements S1 to S3 are turned on by the touch enable signal T_EN, the sensing signals transmitted from the fingerprint/touch sensing routing wires FTRW1 to FTRW3 are integrated through the one line and provided to the integrator of the third integration block IB3. On the other hand, when the first to third switching elements S1 to S3 are turned on by the fingerprint enable signal F_EN, the sensing signals transmitted from the fingerprint/touch sensing routing wires FTRW1 to FTRW3 are respectively provided to integrators of the second integration block IB2.

The second integration block IB2 includes integrators that respectively integrate analog sensing voltages received from the first fingerprint/touch sensing routing wires FTRW1 to FTRW3 through the switching block SB. Each integrator of the second integration block IB2 includes an operational amplifier OP having a first input terminal a connected to a reference voltage source Vref, a second input terminal b connected to one of the touch sensing routing wires TRGW1 to TRGW7 and a single output terminal, and a capacitor C connected in parallel with the operational amplifier OP between the second input terminal b and the output terminal of the operational amplifier OP.

The third integration block IB3 includes an integrator that integrates an integrated analog sensing voltage received from a first fingerprint/touch sensing routing wire group FTRWG1 through the switching block SB. The integrator of the third integration block IB3 includes an operational amplifier OP having a first input terminal a connected to the reference voltage source Vref, a second input terminal b connected to the first fingerprint/touch sensing routing wire group FTRWG1 and a single output terminal, and a capacitor C connected in parallel with the operational amplifier OP between the second input terminal b and the output terminal of the operational amplifier OP.

The second analog/digital converter unit ADC2 includes a plurality of fingerprint analog/digital converters FAD1 to FAD3 that respectively convert analog data output from the integrators of the second integration block IB2 into digital data.

The third analog/digital converter unit ADC3 includes a second touch analog/digital converter TAD8 that converts analog data output from the integrator of the third integration block IB3 into digital data.

The read-out IC ROIC provides first digital data obtained by grouping and sensing the first fingerprint/touch electrodes FTR1 to FTR3 to the fingerprint/touch controller FTC during touch driving and provides second digital data obtained by respectively sensing the first fingerprint/touch electrodes FTR1 to FTR3 to the fingerprint/touch controller FTC during fingerprint driving.

The fingerprint/touch controller FTC recognizes touch by analyzing the first digital data supplied from the read-out IC ROIC using a known touch recognition algorithm and recognizes a fingerprint by analyzing the second digital data using a known fingerprint recognition algorithm.

Figure 9:
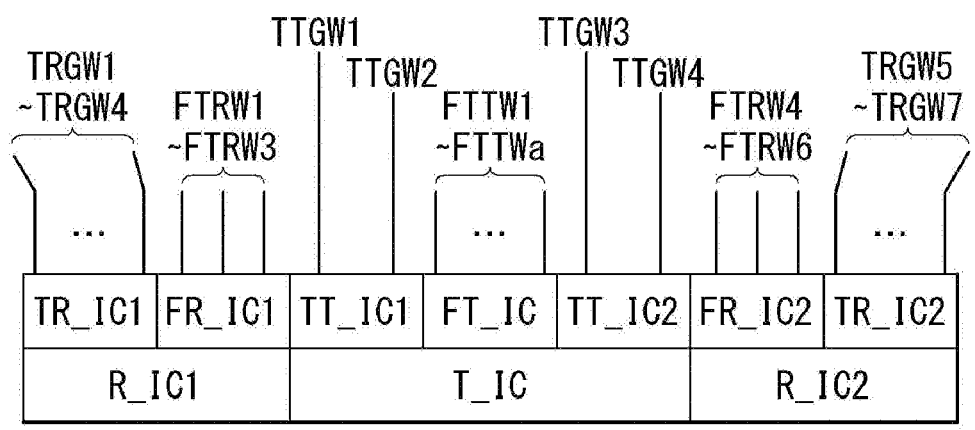
FIG. 9 is a schematic diagram illustrating a configuration of a read-out IC (ROIC) of a sensor screen according to an embodiment of the present disclosure.

FIG. 9 illustrates the configuration of the read-out IC ROIC of the sensor screen according to an embodiment of the present disclosure.

Referring to FIG. 9, the read-out IC ROIC includes a driving IC T_IC, a first sensing IC R_IC1 arranged at the left side of the driving IC T_IC and a second sensing IC R_IC2 arranged at the right side of the driving IC T_IC.

The driving IC T_IC includes a fingerprint/touch driving IC FT_IC, a first touch driving IC TT_IC1 disposed at the left side of the fingerprint/touch driving IC FT_IC and a second touch driving IC TT_IC2 disposed at the right side of the fingerprint/touch driving IC FT_IC.

The fingerprint/touch driving IC FT_IC is connected to the fingerprint/touch driving routing wires FTTW1 to FTTWa, provides the fingerprint driving voltage to the fingerprint/touch driving electrodes FTT1 to FTTa during fingerprint driving and provides the touch driving voltage to the fingerprint/touch driving electrodes FTT1 to FTTa during touch driving.

The first touch driving IC TT_IC1 is connected to the touch driving routing wires TTGW1 and TTGW2 to provide the touch driving voltage to the touch driving electrode groups TTG1 and TTG2 during touch driving. The second touch driving IC TT_IC2 is connected to the touch driving routing wires TTGW3 and TTGW4 to provide the touch driving voltage to the touch driving electrode groups TTG3 and TTG4 during touch driving.

A first sensing IC R_IC1 includes a first fingerprint/touch sensing IC FR_IC1 and a first touch sensing IC TR_IC1 disposed at the left side of the first fingerprint/touch sensing IC FR_IC1.

The first fingerprint/touch sensing IC FR_IC1 integrates analog sensing signals of the fingerprint/touch sensing electrodes FTR1 to FTR3, sensed through the fingerprint/touch sensing routing wires FTRW1 to FTRW3, converts the analog sensing signals into digital signals and provides the digital signals to the fingerprint/touch controller FTC during fingerprint driving.

The first touch sensing IC TR_IC1 integrates analog sensing signals of the touch sensing electrode groups TRG1 to TRG4, sensed through the touch sensing routing wires TRGW1 to TRGW4, converts the analog sensing signals into digital signals and provides the digital signals to the fingerprint/touch controller FTC during touch driving.

A second sensing IC R_IC2 includes a second fingerprint/touch sensing IC FR_IC2 and a second touch sensing IC TR_IC2 disposed at the right side of the second fingerprint/touch sensing IC FR_IC2.

The second fingerprint/touch sensing IC FR_IC2 integrates analog sensing signals of the fingerprint/touch sensing electrodes FTR4 to FTR6, sensed through the fingerprint/touch sensing routing wires FTRW4 to FTRW6, converts the analog sensing signals into digital signals and provides the digital signals to the fingerprint/touch controller FTC during fingerprint driving.

The second touch sensing IC TR_IC2 integrates analog sensing signals of the touch sensing electrode groups TRG5 to TRG7, sensed through the touch sensing routing wires TRGW5 to TRGW7, converts the analog sensing signals into digital signals and provides the digital signals to the fingerprint/touch controller FTC during touch sensing.

The fingerprint/touch controller FTC determines a touch point from the sensing signals from the touch sensing electrode groups TRG1 to TRG7 and the fingerprint/touch sensing electrode groups FTRG1 and FTRG2 using a known touch recognition algorithm during touch driving. In addition, the fingerprint/touch controller FTC recognizes a fingerprint from the sensing signals from the fingerprint/touch sensing electrodes FTR1 to FTR6 using a known fingerprint recognition algorithm during fingerprint driving.

A description will be given of horizontal driving and vertical driving of the sensor screen with reference to FIGS. 10A and 10B.

Figure 10A:
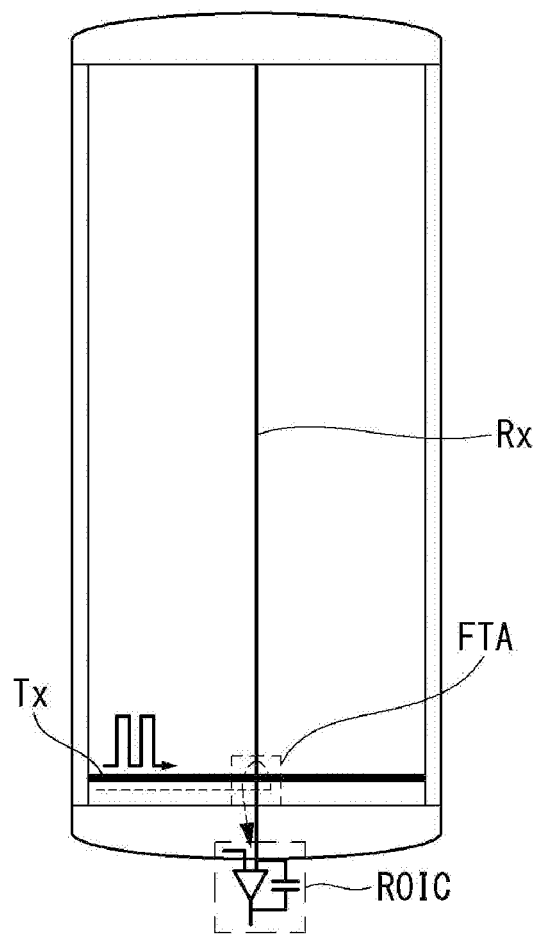
FIG. 10A is a diagram for explaining the concept of horizontal driving of a sensor screen of the related art.
Figure 10B:
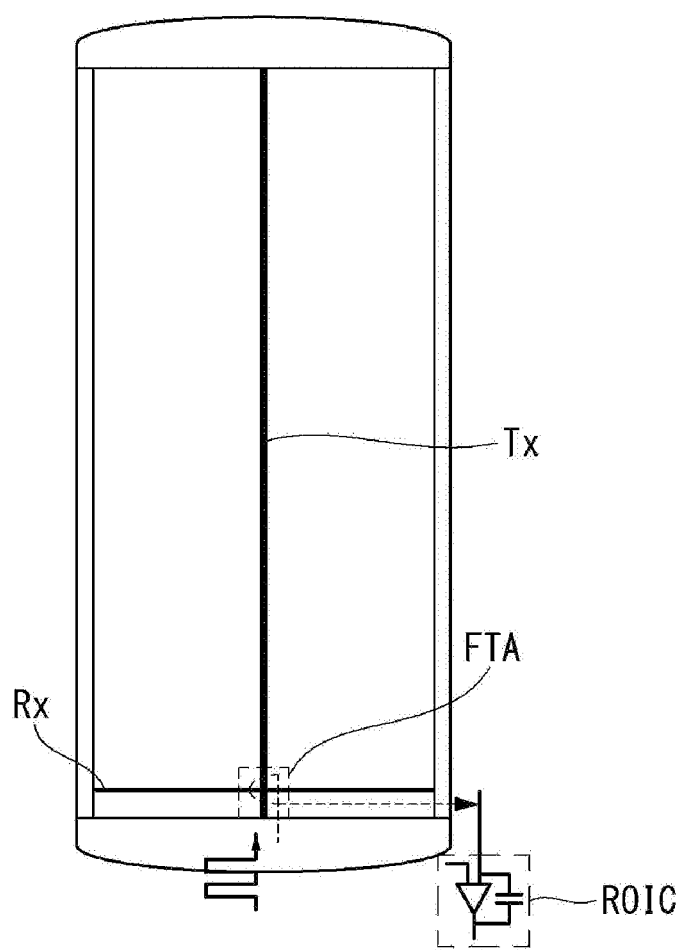
FIG. 10B is a diagram for explaining the concept of vertical driving of the sensor screen according to an embodiment of the present disclosure.

FIG. 10A is a diagram for explaining the concept of horizontal driving of a sensor screen of the related art and FIG. 10B is a diagram for explaining the concept of vertical driving of the sensor screen according to an embodiment of the present disclosure.

Referring to FIG. 10A, the sensor screen of the related art applies a driving voltage to driving electrodes Tx arranged in the minor axis direction and senses sensing electrodes Rx arranged in the major axis direction to recognize a touch/fingerprint.

Referring to FIG. 10B, the sensor screen according to an embodiment of the present disclosure applies a driving voltage to driving electrodes Tx arranged in the major axis direction and senses sensing electrodes Rx arranged in the minor axis direction to recognize a touch/fingerprint.

In FIGS. 10A and 10B, the fingerprint/touch area FTA is arranged at a center of a lower-side end of the active area AA.

In the sensor screen of the related art, a sensing signal is supplied to the read-out IC ROIC along a long path indicated by an arrow, as illustrated in FIG. 10A, and thus resistance and parasitic capacitance increase.

In the sensor screen according to the present disclosure, a sensing signal is provided to the read-out IC ROIC along a short path indicated by an arrow, as shown in FIG. 10B, and thus a signal supply path is reduced. Accordingly, resistance and parasitic capacitance of the sensing signal supply path of the sensor screen of the present disclosure become lower than those of the sensor screen of the related art.

In general, touch sensitivity increase as parasitic capacitance Cp between a driving electrode and a sensing electrode decreases and the time constant τ of the driving electrode decreases.

Table 1 shows driving electrode time constant values and sensing electrode capacitance values of the sensor screen of the related art and the sensor screen of the present disclosure.

TABLE 1

|  | Driving electrode time constant (T = RC) | Cp |
| --- | --- | --- |
| Related art | 0.5 μs | 18 pF |
| Present disclosure | 0.3 μs | 9 pF |

As shown in Table 1, the driving electrode time constant τ is reduced by about 40% and parasitic capacitance Cp between a driving electrode and a sensing electrode is reduced by about 50%, in the sensor screen of the present disclosure. Accordingly, it can be known that fingerprint/touch sensitivity of the sensor screen according to the present disclosure is remarkably improved compared to the sensor screen of the related art.

The aforementioned sensor screen according to the embodiment of the present disclosure can be applied to flat panel displays such as a liquid crystal display (LCD), a field emission display (FED), a plasma display panel (PDP), an organic light emitting diode (OLED) display and an electrophoretic display (EPD).

The screen sensor according to the present disclosure can reduce parasitic capacitance of sensing electrodes and the time constant of driving electrodes by employing the major axis driving scheme in which the touch sensing electrode groups and the fingerprint/touch sensing electrode groups are arranged in the minor axis direction and the touch driving electrode groups and the fingerprint/touch driving electrodes are arranged in the major axis direction, thereby improving touch recognition and fingerprint recognition accuracy.

In addition, the ground electrodes are arranged above and below the touch sensing electrode groups and the fingerprint/touch sensing electrode groups. Accordingly, neighboring touch sensing electrode groups are shielded from each other, a touch sensing electrode group and a fingerprint/touch sensing electrode group, which are adjacent to each other, are shielded from each other and neighboring fingerprint/touch sensing electrode groups are shielded from each other, and thus electromagnetic effects are not applied to neighboring electrodes. Therefore, touch recognition and fingerprint recognition accuracy can be enhanced.

Those skilled in the art will appreciate that the present disclosure may be carried out in other specific ways than those set forth herein without departing from the spirit and essential characteristics of the present disclosure. For example, the touch driving electrode groups, the touch sensing electrode groups, the fingerprint/touch driving electrodes, the fingerprint/touch sensing electrodes and various wires described in the embodiments of the present disclosure are exemplary and do not affect the scope of the present disclosure. Therefore, the scope of the disclosure should be determined by the appended claims and their legal equivalents, not by the above description, and all changes coming within the meaning and equivalency range of the appended claims are intended to be embraced therein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch screen including an active area having a minor axis direction and a major axis direction intersecting each other, and a bezel area outside the active area, comprising:
    a plurality of touch sensing electrode groups extending in the minor axis direction;
    a plurality of touch driving electrode groups extending in the major axis direction;
    a plurality of fingerprint and touch driving electrodes extending in the major axis direction and positioned between a first touch driving electrode group of the plurality of touch driving electrode groups and a second touch driving electrode group of the plurality of touch driving electrode groups;
    a plurality of fingerprint and touch sensing electrodes extending in the minor axis direction and spaced apart from and positioned between an outermost touch sensing electrode group from among the plurality of touch sensing electrode groups and the bezel area;
    a read-out integrated circuit (IC) arranged adjacent to the plurality of fingerprint and touch sensing electrodes;
    a switching block including a plurality of switching elements controlled by a touch enable signal and a fingerprint enable signal having opposite polarities;
    a first integration block including a plurality of first integrators respectively coupled to first outputs of the switching elements;
    a second integration block including a second integrator coupled to second outputs of the switching elements;
    a first analog-to-digital converter unit including a plurality of fingerprint analog-to-digital converters respectively coupled to outputs of the first integrators; and
    a second analog-to-digital converter unit including a touch analog-to-digital converter coupled to an output of the second integrator.

2. The touch screen according to claim 1, further comprising ground electrodes arranged between neighboring touch sensing electrode groups and between at least one touch sensing electrode group and at least one fingerprint and touch sensing electrode that are adjacent to each other.

3. The touch screen according to claim 2, wherein a width of each ground electrode is greater than a width of each touch sensing electrode group.

4. The touch screen according to claim 3, wherein a first plurality of the ground electrodes are coupled to one another by a first ground routing wire at a first side of the bezel area and a second plurality of the ground electrodes are coupled to one another by a second ground routing wire at a second side of the bezel area.

5. The touch screen according to claim 1, wherein a fingerprint and touch area is defined by intersections of the plurality of fingerprint and touch driving electrodes and the plurality of fingerprint and touch sensing electrodes, and
wherein the plurality of fingerprint and touch sensing electrodes extend from the fingerprint and touch area to each of two opposite ends of the active area outside the fingerprint and touch area.

6. The touch screen according to claim 1, wherein a fingerprint and touch area is defined by intersections of the plurality of fingerprint and touch driving electrodes and the plurality of fingerprint and touch sensing electrodes,
wherein the plurality of fingerprint and touch sensing electrodes extend from a first end of the fingerprint and touch area, through the fingerprint and touch area, to a first end of the active area outside the fingerprint and touch area, and
further comprising a touch sensing electrode that is separated from the plurality of fingerprint and touch sensing electrodes and that extends from the first end of the fingerprint and touch area to a second end of the active area outside the fingerprint and touch area.

7. The touch screen according to claim 1, wherein, during a touch driving period, the read-out IC provides a touch driving signal to the plurality of touch driving electrode groups and the plurality of fingerprint and touch driving electrodes through a plurality of touch driving routing wires and a plurality of fingerprint and touch driving routing wires, respectively, and receives a touch signal sensed by the plurality of touch sensing electrode groups and the plurality of fingerprint and touch sensing electrodes through a plurality of touch sensing routing wires and a plurality of fingerprint and touch sensing routing wires, respectively.

8. The touch screen according to claim 1, wherein, during a fingerprint driving period, the read-out IC provides a fingerprint driving signal to the plurality of fingerprint and touch driving electrodes through a plurality of fingerprint and touch driving routing wires and receives a fingerprint signal sensed from the plurality of fingerprint and touch sensing electrodes through a plurality of fingerprint and touch sensing routing wires.

9. The touch screen according to claim 8, wherein
each of the switching elements including the first and second outputs, the first outputs being configured to respectively output a plurality of sensing signals received from the fingerprint and touch sensing routing wires, the second outputs being coupled to one another and configured to integrate the plurality of sensing signals into one signal and to output the integrated signal,
the first integration block is configured to receive the plurality of sensing signals from the switching block, and
the second integration block is configured to receive the integrated sensing signal from the switching block.

10. The touch screen according to claim 1, wherein the read-out IC provides driving voltages for touch and fingerprint recognition to the plurality of driving electrode groups and the plurality of fingerprint and touch driving electrodes, and recognizes a touch and a fingerprint by sensing the plurality of touch sensing electrode groups and the plurality of fingerprint and touch sensing electrodes.

* * * * *